US012602472B2

(12) United States Patent

Limaye

(10) Patent No.: US 12,602,472 B2

(45) Date of Patent: Apr. 14, 2026

(54) BLINDING COUNTERMEASURE TO SECURE MULTIPLICATION OPERATIONS AGAINST SIDE CHANNEL ATTACKS

(71) Applicant: Synopsys, Inc., Sunnyvale, CA (US)

(72) Inventor: Nimisha Limaye, Jersey City, NJ (US)

(73) Assignee: Synopsys, Inc., Sunnyvale, CA (US)

( * ) Notice: Subject to any disclaimer, the term of this patent is extended or adjusted under 35 U.S.C. 154(b) by 232 days.

(21) Appl. No.: 18/202,173

(22) Filed: May 25, 2023

(65) Prior Publication Data

US 2024/0394367 A1 Nov. 28, 2024

(51) Int. Cl.
| | |
|---|---|
| *G06F 21/55* | (2013.01) |
| *G06F 5/01* | (2006.01) |
| *G06F 7/523* | (2006.01) |
| *G06F 21/75* | (2013.01) |
| *H04L 9/00* | (2022.01) |

(52) U.S. Cl.
CPC .............. *G06F 21/556* (2013.01); *G06F 5/01* (2013.01); *G06F 7/523* (2013.01); *G06F 21/755* (2017.08); *H04L 9/003* (2013.01)

(58) Field of Classification Search
None
See application file for complete search history.

(56) References Cited

U.S. PATENT DOCUMENTS

| | | | | |
|---|---|---|---|---|
| 2003/0140240 A1* | 7/2003 | Jaffe | .................... | G06F 21/602 |
| | | | | 713/193 |
| 2019/0379529 A1* | 12/2019 | Meyer | .................... | H04L 9/008 |
| 2021/0194689 A1* | 6/2021 | Susella | .................... | H04L 9/14 |
| 2021/0306134 A1* | 9/2021 | Bocchi | .................... | H04L 9/003 |
| 2023/0259638 A1* | 8/2023 | Yang | .................... | G06F 21/72 |
| | | | | 726/26 |
| 2024/0053963 A1* | 2/2024 | Mueller | .................... | G06F 5/01 |

* cited by examiner

*Primary Examiner* — Philip J Chea
*Assistant Examiner* — James Ross Hollister
(74) *Attorney, Agent, or Firm* — Patterson + Sheridan, LLP

(57) ABSTRACT

Certain aspects are directed to apparatus and methods for performing a blinded operation. The method generally includes: obtaining a first operand and a second operand for a multiplication operation; performing, via one or more processors, one or more shift operations or a bit-flip operation on the first operand to generate a first blinded operand; and performing the multiplication operation based on the first blinded operand and the second operand to generate a blinded multiplication result.

20 Claims, 5 Drawing Sheets

$W_1 = 7$ $W_2 = 5$ $W_3 = 4$ $W_4 = 4$

Time

Hamming Weight

100

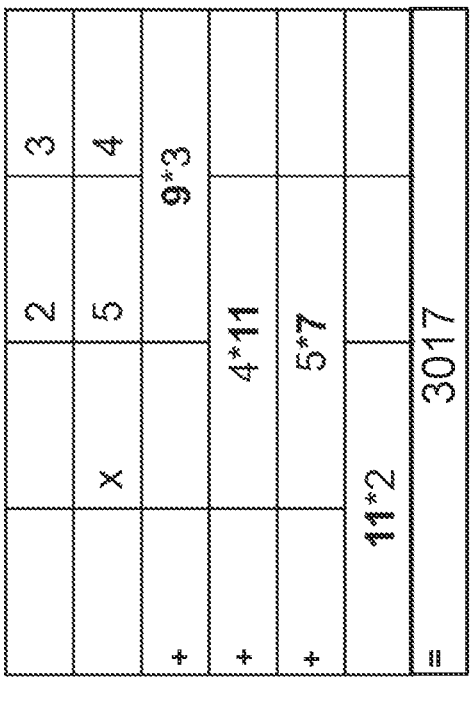
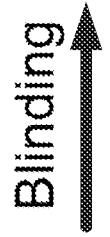
Blinding
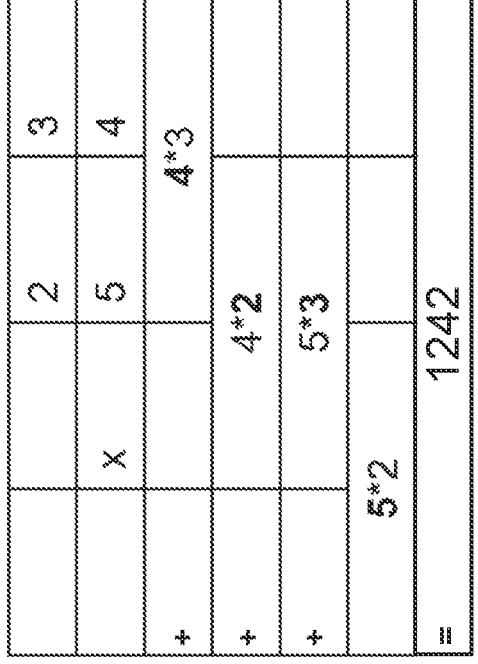
FIG. 3

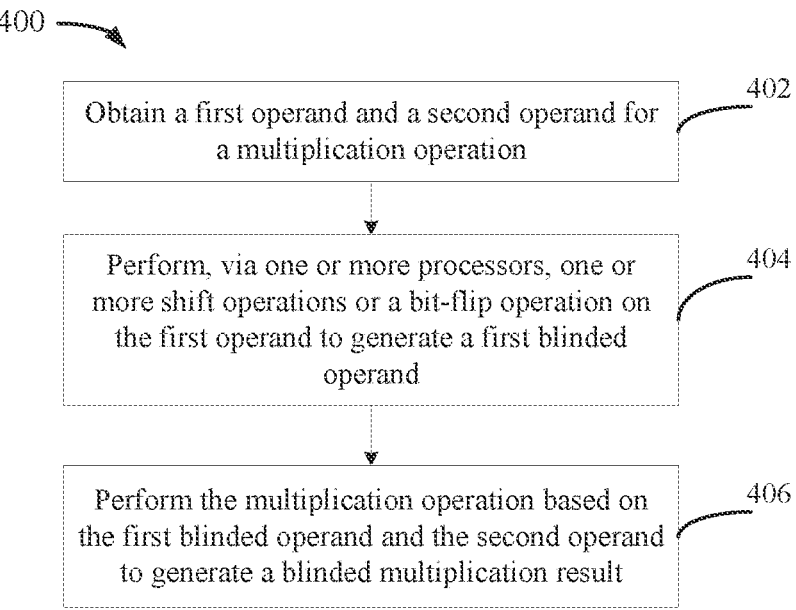

400

Obtain a first operand and a second operand for a multiplication operation          402

Perform, via one or more processors, one or more shift operations or a bit-flip operation on the first operand to generate a first blinded operand          404

Perform the multiplication operation based on the first blinded operand and the second operand to generate a blinded multiplication result          406

FIG. 4

BLINDING COUNTERMEASURE TO SECURE MULTIPLICATION OPERATIONS AGAINST SIDE CHANNEL ATTACKS

TECHNICAL FIELD

The present disclosure generally relates to performing blinded multiplication operations, and more particularly, performing blinded multiplication operations using shift or bit-flip operations.

BACKGROUND

Side channel attacks are a type of physical attack that exploits vulnerabilities resulting from a hardware implementation leading to information leakage from a system. Side channel attacks may exploit information leaks such as electromagnetic radiation associated with the power consumption of the system. These information leaks may be used to infer secret information such as encryption keys in a cryptography core. Side channel attacks can be difficult to detect and defend against as they can be carried out remotely with little resources. Conventional countermeasures against side channel attacks incur penalties in terms of device area, power, and performance overhead. Therefore, there is a need for improved countermeasures against side channel attacks to protect sensitive information.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects of the present disclosure are directed to a method for performing a blinded operation. The method generally includes: obtaining a first operand and a second operand for a multiplication operation; performing, via one or more processors, one or more shift operations or a bit-flip operation on the first operand to generate a first blinded operand; and performing the multiplication operation based on the first blinded operand and the second operand to generate a blinded multiplication result.

Certain aspects of the present disclosure are directed to an apparatus for performing a blinded operation. The apparatus generally includes a memory and one or more processors coupled to the memory and configured to: obtain a first operand and a second operand for a multiplication operation; perform, via one or more processors, one or more shift operations or a bit-flip operation on the first operand to generate a first blinded operand; and perform the multiplication operation based on the first blinded operand and the second operand to generate a blinded multiplication result.

Certain aspects of the present disclosure are directed to a computer-readable medium having instructions stored thereon, that when executed by one or more processors, are configured to: obtain a first operand and a second operand for a multiplication operation; perform one or more shift operations or a bit-flip operation on the first operand to generate a first blinded operand; and perform the multiplication operation based on the first blinded operand and the second operand to generate a blinded multiplication result.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 illustrates an example blinding approach for multiplication of multi-hexadecimal numbers, in accordance with certain aspects of the present disclosure.

FIG. 4 is a flow diagram illustrating example operations for performing a blinded operation, in accordance with certain aspects of the present disclosure.

DETAILED DESCRIPTION

Figure 1:
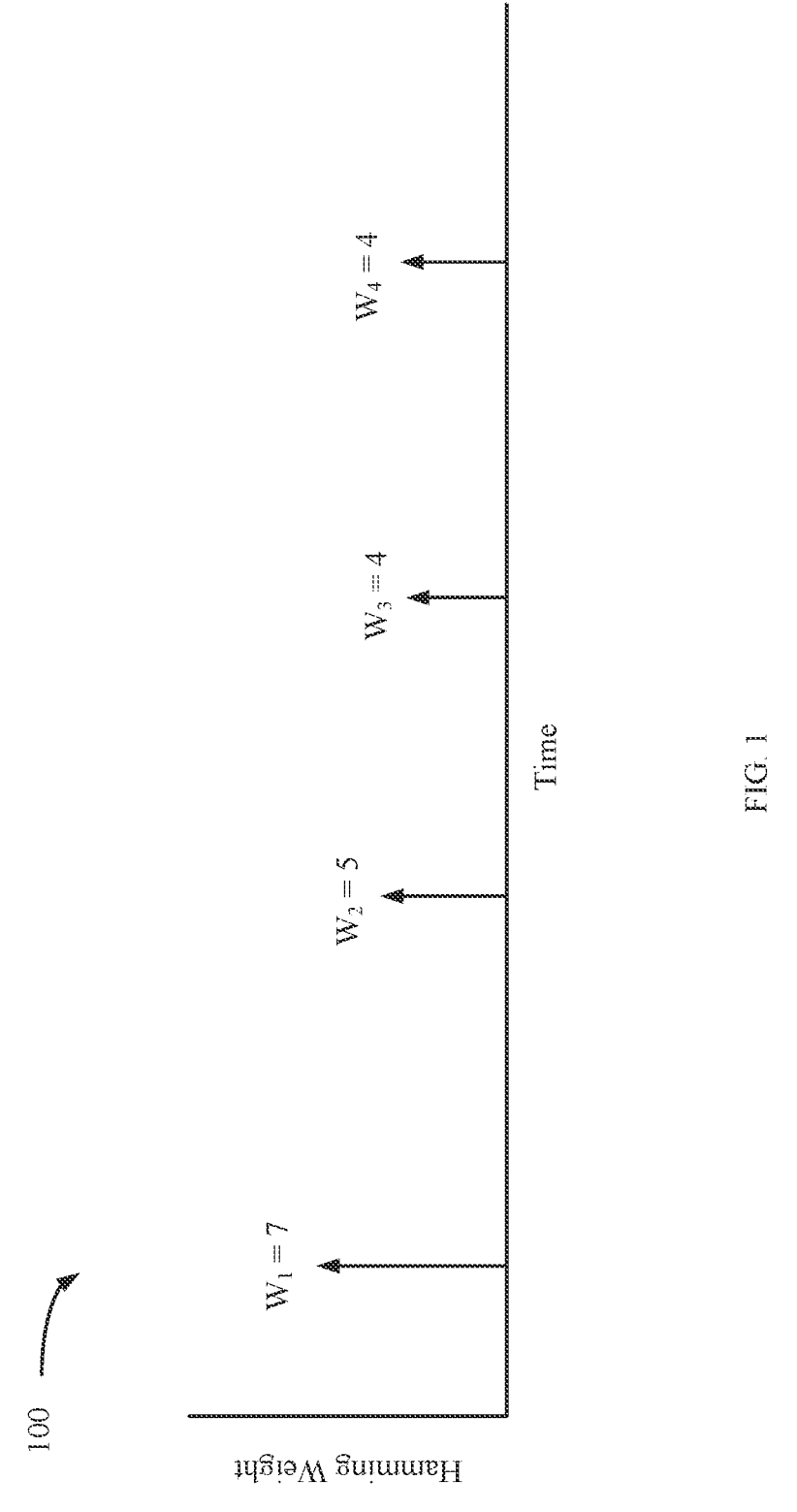
FIG. 1 illustrates different power consumptions associated with processing products having different Hamming weights.

Certain aspects of the present disclosure are directed towards a cost-effective blinding countermeasure to secure multiplication operations against side channel attacks. The countermeasures described herein may be applied to securing any algorithm using multiplication, such as public key cryptography algorithms. Side channel attacks are a threat to the symmetric/asymmetric key and post-quantum cryptography algorithms.

Some aspects provide techniques for protecting against any suitable side channel attack such as simple power analysis (SPA) attacks, differential power analysis (DPA) attacks, simple electromagnetic analysis (SEMA), timing analysis (TA), and differential electromagnetic analysis (DEMA)-based attacks by blinding multiplication operations with reduced impact on performance as compared to conventional implementations. SPA attacks refer to a type of side channel attack where an attacker analyses the power consumption of a system to identify secret information about the system. For example, the attacker may infer a secret key used for cryptography based on power consumption. An SPA attack may use a single trace to infer the secret key, identify the underlying cipher using timing information (e.g., how long it takes to complete an operation), and/or identify the start and end of intermediate blocks. A DPA attack may involve comparing the power consumptions of known and unknown operations. A DPA attack may involve multiple traces to decipher a secret key and may be used when noise is added to thwart SPA. In other words, a DPA is a technique that involves correlating collected power measurements. Similarly, DEMA involves correlating a system's collected electromagnetic emanations and may involve multiple traces to infer a secret key. One variant may include a TA. If for DPA/DEMA, a graph is generated having a y-axis that corresponds to either the power consumption measurements or electromagnetic emanations, then in TA, the x-axis may correspond to the time/duration of the measurement being considered. For multiplication, if two different operands incur different power traces, and this difference can indicate the value of the operands, the associated secret information may be leaked.

Certain aspects of the present disclosure are directed towards countermeasures for attacks attempting to infer secret information by blinding the value of operands. Certain aspects may be applied to a multiplicand and/or a multiplier during a multiplication operation. The countermeasures described herein may be used to secure any cryptography algorithm such as, but not limited to, Rivest-Shamir-Adleman (RSA) public-key algorithm, Advanced Encryption Standard (AES) symmetric-key algorithm, Diffie Hellman Key-exchange, and Kyber Post-Quantum algorithms which contain multiplication operations.

For example, consider a product between values 4 and 2 which is equal to 0100x0010=1000 in binary format. Also, consider a product between values 3 and 5 which is equal to 0011x0101=1111 in binary format. The Hamming weight of the first product (e.g., 0100x0010=1000) is 1 whereas the Hamming weight of the second product is 4 (e.g., 0011x0101=1111). A Hamming weight of a binary code is the number of non-zero elements (e.g., logic highs or 1's) in the binary code. The difference in the Hamming weight between products translates to different power consumptions when processing the products using a device.

FIG. 1 is a graph 100 illustrating different power consumptions associated with processing products having different Hamming weights. For example, as shown in FIG. 1, the power consumption associated with processing a product with a Hamming weight of 7 differs from the power consumption associated with processing a product with a Hamming weight of 4. These differences in power consumption may be used to identify secret information (e.g., processing of products) about a system. Conventionally, countermeasures to prevent (or at least reduce) side channel attacks such as DPA/DEMA based attacks incur significant performance overhead.

Certain aspects are directed to a cost-effective blinding countermeasure such that the power trace associated with processing a product of values does not leak information (or at least reduces information leakage) about the Hamming weights of the operands. For example, certain aspects provide a countermeasure to secure multiplication operations with low processing costs. The countermeasure may involve only shift and subtraction/addition operations (e.g., compared to some conventional implementations involving multiplication or squaring operations that incur greater processing costs).

The countermeasures described herein may be applied to any operand value. The countermeasures may involve changing the Hamming weight of any operand to blind/mask the associated product operation. As described, the countermeasures may involve the use of shift and subtraction/addition operands to blind and unblind the operands, allowing the countermeasure to be implemented with reduced processing costs. In some embodiments, the countermeasure may blind operands which have 0 value in MSb locations, 0 value in LSb locations, or even 0/1 value in non-MSb/LSb locations. The countermeasure may be implemented using randomness in choosing which operand to blind and which bit location(s) to blind, preventing (or at least reducing) the data leakage.

The countermeasure technique described herein may involve a blinding operation and an unblinding operation. For example, the blinding operation may involve flipping a value 0 to a value 1 and vice versa to change the operand's Hamming weight. The unblinding operation may involve shift and subtraction/addition operation(s) depending on the approach and number of bits flipped, as described in more detail herein. The countermeasure techniques may be applied for any multiplication operation and, thus, may extend to multiple cryptography algorithms.

With each run and collected trace, the operands for the multiplication operation may change, thereby leaking any information about the operands. Consider, for example, the multiplication operation 12×3=36. In binary, the multiplication operation may be represented as 1100x0011=100100 which has a Hamming weight of 2. The operand(s) may be blinded by providing a different Hamming weight in some aspects. For example, suppose one of the most significant bits (MSb(s)) of value 3 is blinded as follows: $(3)_{M1}$=0111=7. Thus, 12×7=84=1010100 which has a Hamming weight of 3. Subscript M1 denotes 1 MSb is blinded. In other words, 0011 may be changed to 0111 by flipping the logic value of the third bit of the value 3 in binary. As a result, the associated multiplication operation provides a result that has a Hamming weight of 3 instead of 2.

As another example, the intermediate value in the value 12 may be blinded as follows: $(12)_{I1}$=1110x0011=42=101010 which has a Hamming weight of 3. Here subscript I1 denotes the bit at intermediate location 1 being flipped. In other words, the second bit of the value 12 in binary is flipped from 0 to 1, resulting in a Hamming weight of 3 instead of 2.

As another example, the least significant bit (LSb) of value 12 may be blinded as follows: $(12)_{L2}$=1111=15. Thus, 15×3=1111x0011=45=101101 which has a Hamming weight of 4. Here subscript L2 denotes that two LSb(s) are blinded. In other words, the first and second bits of the value 12 in binary are flipped, resulting in a Hamming weight of 4 instead of 2.

In some aspects, the choice of the blinding approach and the number of bits blinded, or the intermediate value flipped, may be random with each run/trace. The unblinding operation may involve shift and subtraction/addition operations, as described in more detail herein. If multiple intermediate values are flipped, then the number of shift and subtraction/addition operations increases linearly. The blinding may be applied on individual digits to further increase the effect of blinding on the power/electromagnetic (EM) traces (e.g., further change the Hamming weight and disassociate the correct product value from the power/EM traces).

Figure 2:
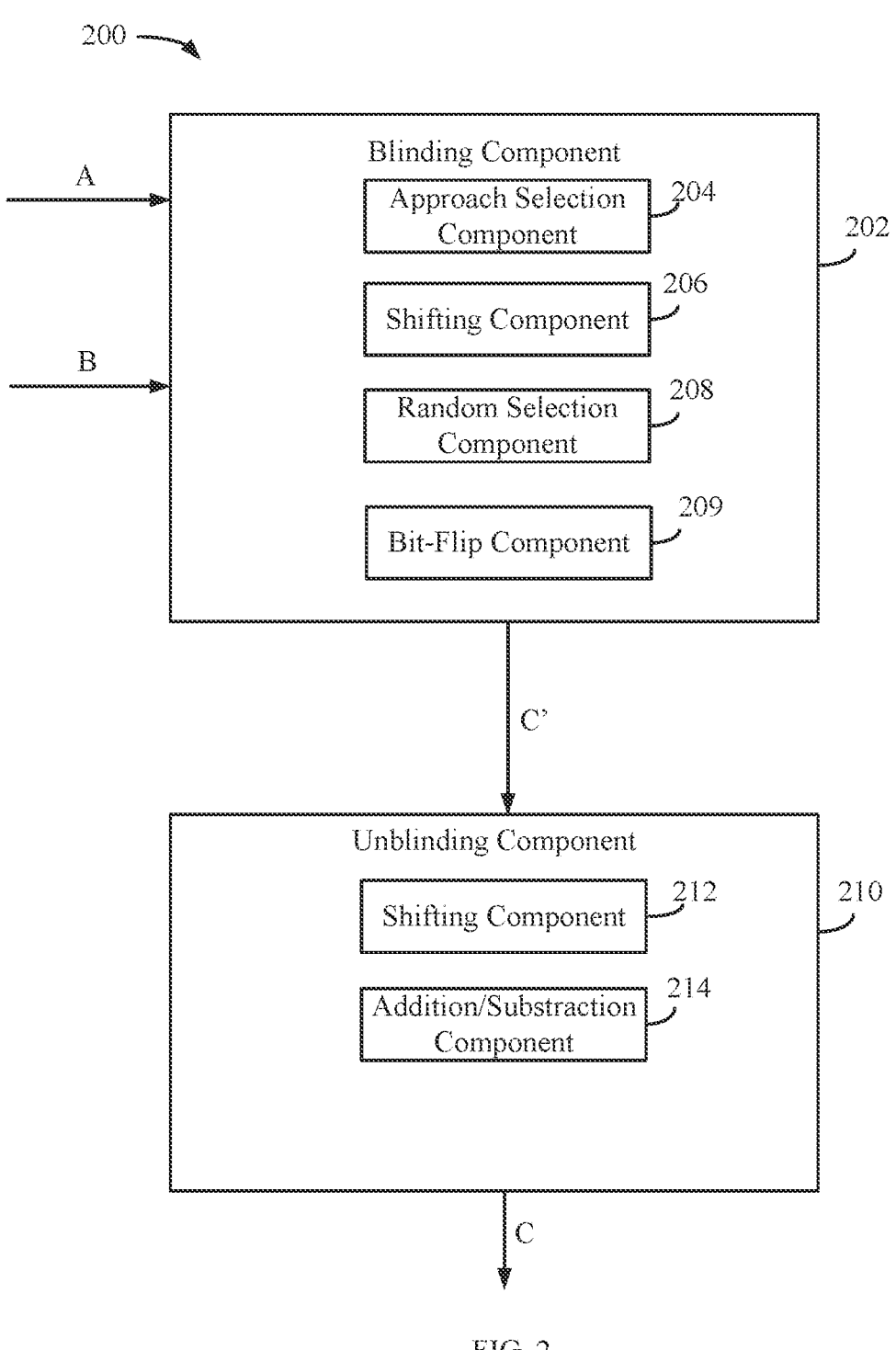
FIG. 2 illustrates an example computing system having a blinding component and an unblinding component, in accordance certain aspects of the present disclosure.

FIG. 2 illustrates an example computing system 200 having a blinding component 202 and an unblinding component 210, in accordance certain aspects of the present disclosure. As shown, the blinding component receives operands A and B and generates a blinded multiplication results C' of operands A and B. The unblinding component 210 unblinds C' to generate the unblinded multiplication result C, as shown.

In some aspects, different approaches for generating the blinded multiplication result C' may be available. The blinding approaches are described in more detail herein. The blinding component may include an approach selection component 204 for selecting the blinding approach to be used.

Certain aspects of the present disclosure provide a blinding/unblinding approach for operands that includes a 0 in the MSb location of the operand. In other words, the approach selection component 204 may select this approach if the operand A or B to be blinded includes a 0 in the MSb location. Consider two operands A and B. A may have x bits as MSb(s) which are zero. A random number (b) may be chosen between 0 and x (e.g., via a random selection component 208 of the blinding component 202). The random number b may represent the number of shifts to be made on operand A. The operand A may be blinded (e.g., via the shifting component 206) in accordance with the following expression:

$$A' = A << b_1 = A \times 2^b + (2^b - 1)$$

where $<<b_1$ indicates a left shift of b times with a value 1 being used as the LSb after each shift. For example, $0010<<b_1$ where b is 1 may equal 0101. Thus, a value C' (the result of multiplication after blinding A) may be calculated per expression:

$$C' = A' \times B = (A \times 2^b + (2^b - 1)) \times B$$

To recover the original value C=A×B, the following unblinding operations may be performed by the unblinding component 210:

$$(A \times 2^b + (2^b - 1)) \times B = C'$$

$$(A \times 2^b \times B) = C' - [(2^b - 1) \times B]$$

$$A \times B = [C' - [(2^b - 1) \times B]] \times 2^{-b}$$

$$A \times B = [C' - [(B << b_0) - B]] >> b_0 = C$$

where $<<b_0$ indicates a left shift of b times with a value 0 being used as the LSb after each shift and $>>b_0$ indicates a right shift of b times with a value 0 being used as the LSb after each shift. Unblinding is carried out using two shifts (e.g., via shifting component 212) and two subtraction operations (e.g., via addition/subtraction component 214) to recover the original output value C.

Certain aspects of the present disclosure provide a blinding/unblinding approach for operands that contain 0 in LSb locations. Consider two operands A and B, where A has x bits as LSb(s) which are zero. A random number (b) may be chosen between 0 and x (e.g., via random selection component 208). This variable represents the number of shifts to be performed on operand A. After applying the blinding on A, a variable A' may be generated (e.g., via shifting component 206) per expression:

$$A' = A >> b_1 = \frac{A}{2^b} + (2^b - 1)2^b$$

Thus, the variable C' (the result of multiplication operations after blinding A) may be calculated per expression:

$$C' = A' \times B = \left(\frac{A}{2^b} + (2^b - 1)2^b\right) \times B$$

To recover the original variable C=A×B, the following unblinding operations may be performed via the unblinding component 210:

$$\left(\frac{A}{2^b} + (2^b - 1)2^b\right) \times B = C'$$

$$\left(\frac{A}{2^b} \times B\right) = C' - [(2^b - 1)2^b \times B]$$

$$A \times B = [C' - [(2^b - 1)2^b \times B]] \times 2^b$$

$$A \times B = [C' - [(B << 2b_0) - (B << b_0)]] << b_0 = C$$

$$\text{OR } A \times B = [C' - (B << b_0)] << b_0 = C \text{ when } b = 1$$

In this manner, unblinding is carried out using two subtractions (e.g., via the additional/subtraction component 214) and three shift operations (e.g., via the shifting component 212) to recover the original output value C.

Certain aspects of the present disclosure provide an approach for blinding intermediate bits in the operand by flipping an intermediate bit value. Consider two operands A and B of size x-bits. A bit from [0, x−1] range may be randomly selected to be flipped (e.g., via random selection component 208). For example, bit b may be selected, b being an integer between 0 and x−1. The blinding on operand A may be performed per expressions via the bit-flip component 209:

$$A' = A \text{ xor } X$$

$$X = x'b0$$

$$X[b] = 1$$

where x is the size of operand A. In other words, to flip the second bit (e.g., b=2) of operand A, A may be XORed with 0010. Thus, the variable C' (the result of multiplication operations after blinding A) may be calculated per expression:

$$C' = A' \times B = A \times B + 2^b \times B \text{ if } A[b] = 0 \text{ (e.g., bit } b \text{ of operand } A \text{ is 0)}$$

$$\text{Else } C' = A' \times B = A \times B - 2^b \times B$$

To recover the original value C=A×B, the following unblinding operations may be performed via the unblinding component 210:

$$A \times B + 2^b \times B = C', \text{ if } A[b] = 0$$

$$A \times B = C' - 2^b \times B$$

$$A \times B = C' - [B << b]$$

$$\text{If } A[b] = 1, \text{ then } A \times B = C' + [B << b]$$

Unblinding is carried out using one subtraction/addition operation (e.g., via addition/subtraction component 214) and one shift operation (e.g., shifting component 212) to recover the original output value C.

While the techniques described have been described by blinding one operand of a multiplication operation, both operands may be blinded in some aspects. In such a case, the unblinding may take place sequentially. For example, for multiplications of operands A and B, the following expressions may be used to blind A and B:

7                                                                8

$$A \times B = C \rightarrow \text{Blind}(A, a) \times \text{Blind}(B, b) = A' \times B' = C''$$

where the variable a represents the bit that is being flipped (or the number of shifts used) to blind A and b represents the bit that is flipped (or the number of shifts used) to blind B. Operand A may be blinded to identify A' by flipping a bit or performing a number of shift operations as described herein. Similarly, B may be blinded to identify B' by flipping a bit or performing a number of shift operations as described herein. A' and B' may be multiplied to identify C''. Unblinding C'' may occur sequentially per the following expressions:

$$\text{Unblind}(C'',B',a)=C'\rightarrow\text{Unblind}(C',A',b)\rightarrow C$$

In other words, C'' may be unblinded based on B' and variable a to obtain C'. Then, C' may be unblinded based on A' and variable b to obtain C.

Furthermore, the blinding/unblinding approaches may be applied to the entire number or to individual digits during the multiplication operation. For example, to blind a hexadecimal value of 4F, the entire hexadecimal value may be blinded, or individual digits of the value may be blinded separately (e.g., 4 is blinded and F is blinded separately).

FIG. 3 illustrates an example blinding approach for Comba method multiplication of multi-hexadecimal numbers, in accordance with certain aspects of the present disclosure. For example, consider multiplying 23 and 54. The blinding may be performed by considering the multi-hexadecimal numbers as one unit, or dividing the multi-hexadecimal numbers into individual hexadecimal digits and blinding the internal multiplication operations. In other words, each of hexadecimal numbers 2, 3, 5, and 4 may be separately blinded when performing the Comba method multiplication of 23 and 54 as shown in FIG. 3. In the example shown in FIG. 3, in each row of the Comba method multiplication, one number may be blinded. For instance, blinding the hexadecimal number 4 provides a blinded number of 9. Thus, instead multiplying 4 and 3, the multiplication of 9 and 3 is performed, as shown. Blinding the hexadecimal number 2 provides a blinded number of 11, blinding the hexadecimal number 3 provides a blinded number of 7, and blinding the hexadecimal number 5 provides a blinded number of 11. Using the blinded numbers to perform the Comba method multiplication, as shown, provides a blinded multiplication result of 3017 (e.g., as opposed to 1242 for the unblinded multiplication).

As the operand size increases, the applicability of blinding may increase. The Hamming weight can be further changed by blinding more intermediate bits in the digits. This may be termed as the blinding effect. In some aspects, as the operand size increases, the performance overhead associated with the blinding/unblinding operations may decrease.

In some aspects, decisions regarding choice of approach, choice of underlying shifts, or bit location, may be taken randomly such that the power profile differs for each trace. In some cases, the choice with regards to the approach may be selected in a manner that equates the Hamming weight of two multiplication operations. For example, assume a code where A is multiplied by B if a variable k is equal to 1, else A is multiplied by C. Based on differing power consumptions, an attacker may infer whether the A×B multiplication was carried out or the A×C multiplication was carried out.

Thus, one or more of the operands may be blinded in a manner such that the Hamming weights associated with A×B and A×C are equal.

Certain aspects provide techniques for protecting security multiplication operations using blinding. The techniques described herein apply to any symmetric/asymmetric or post-quantum cryptography algorithms. The techniques described herein may be used to thwart SPA, TA, DPA, SEMA, and DEMA attacks with little impact on performance. The techniques described herein improve performance as compared to conventional implementation by at least 44% for an operand size greater than 256-bits, and may incur no memory overhead. The number of blinding increases with an increase in operand size for a constant multiplier size.

FIG. 4 is a flow diagram illustrating example operations 400 for performing a blinded operation, in accordance with certain aspects of the present disclosure. The operations 400 may be performed, for example, by a processing device, such as the processing device 502, a blinding component (e.g., blinding component 202) and/or unblinding component (e.g., unblinding component 210).

The operations 400 begin, at block 402, with the processing device obtaining a first operand (e.g., operand A described herein) and a second operand (e.g., operand B described herein) for a multiplication operation. At block 404, the processing device performs one or more shift operations (e.g., via shifting component 206 of FIG. 2) or a bit-flip operation (e.g., via bit-flip component 209 of FIG. 2) on the first operand to generate a first blinded operand (e.g., blinded operand A' described herein).

In some aspects, the first blinded operand is generated by performing the one or more shift operations. In certain aspects, the processing device may randomly select a number of shift operations (e.g., randomly select variable b described herein) associated with the one or more shift operations.

Performing the one or more shift operations may include appending a logic high value to the first operand after each of the one or more shift operations (e.g., perform operation$>>b_1$ or $<<b_1$, as described). The first blinded operand may be generated by performing the one or more shift operations based on the first operand having a MSb that is logic low. In some aspects, a number of shift operations (e.g., associated with the selected variable b as described herein) associated with the one or more shift operations is less than a number of MSb(s) of the first operand that are logic low.

In some aspects, the first blinded operand is generated by performing the one or more shift operations based on the first operand having a LSb that is logic low. In some aspects, a number of shift operations (e.g., associated with the selected variable b as described herein) associated with the one or more shift operations is less than a number of LSb(s) of the first operand that are logic low.

In some aspects the first blinded operand is generated by performing the bit-flip operation. The processing device may randomly select a bit of the first operand to flip for the bit-flip operation.

In some aspects, the processing device may perform one or more shift operations or a bit-flip operation on the second operand to generate a second blinded operand (e.g., B' described herein). The multiplication operation may be performed based on the first blinded operand and the second blinded operand to generate the blinded multiplication result (e.g., C'' described herein).

At block 406, the processing device performs the multiplication operation based on the first blinded operand and the second operand to generate a blinded multiplication result. In some aspects, the processing device may perform one or more shift operations (e.g., via shifting component 212 of unblinding component 210) of the second operand to yield a shifted second operand and unblind the blinded multiplication result based on the shifted second operand. In some aspects, performing the one or more shift operations of the second operand may include appending a logic low value to the second operand after each of the one or more shift operations of the second operand (e.g., perform operation$<<b_0$).

Figure 5:
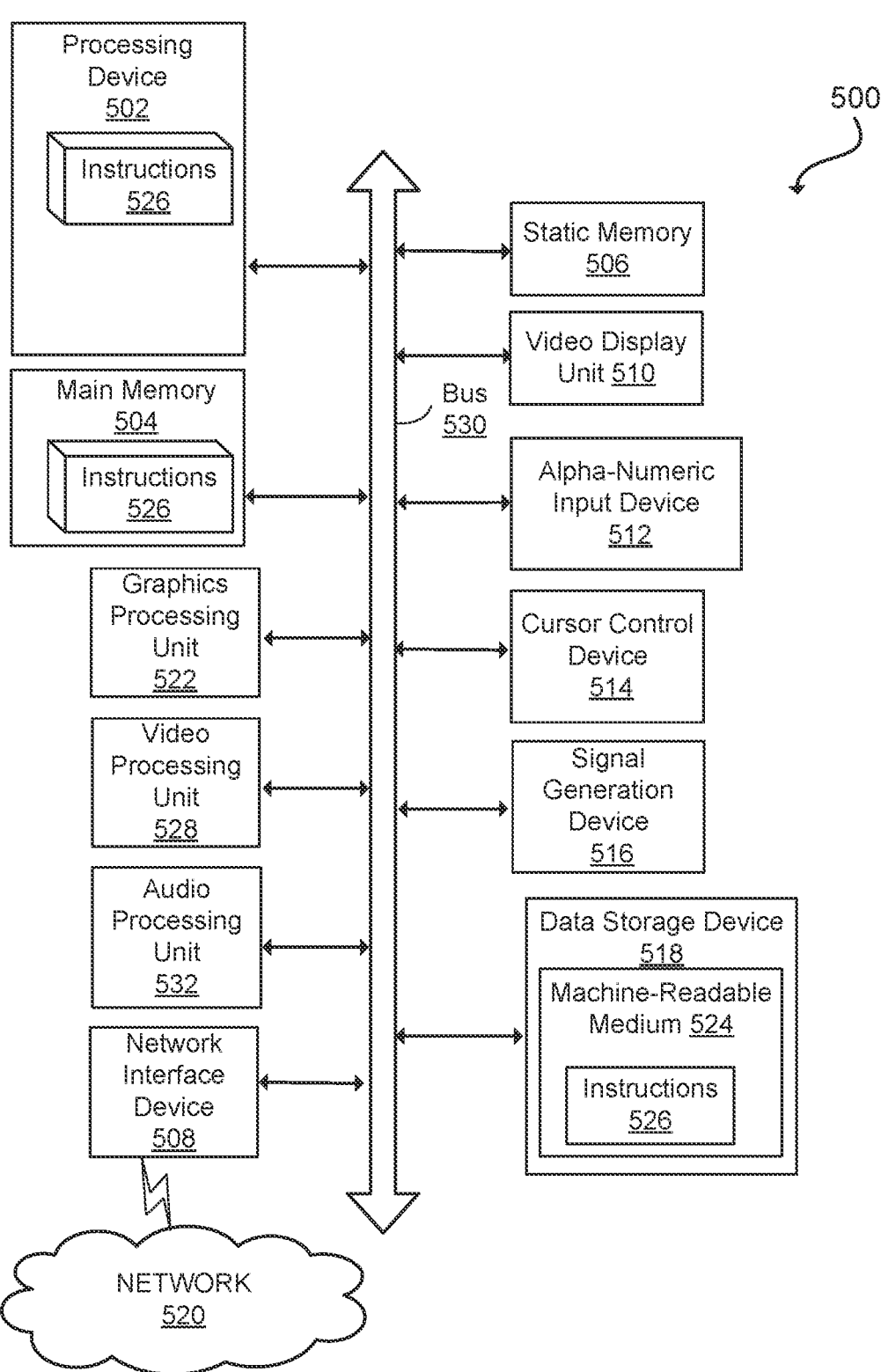
FIG. 5 illustrates an example machine of a computer system within which a set of instructions, for causing the machine to perform any one or more of the methodologies discussed herein, may be executed.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media. In some aspects of the present disclosure, the processing device 502 may include the blinding component 202 and unblinding component 210.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing a blinded operation, comprising:
   obtaining a first operand and a second operand for a multiplication operation;
   performing, via one or more processors, one or more shift operations or a bit-flip operation on the first operand to generate a first blinded operand, wherein the first blinded operand is generated to reduce or randomize a difference between a power profile of the multiplication operation and a power profile of another multiplication operation in order to inhibit side channel attacks for the multiplication operation, the difference being reduced or randomized by implementing a hamming weight adjustment via the one or more shift operations or the bit-flip operation to modify the power profile of the multiplication operation; and performing the multiplication operation based on the first blinded operand and the second operand to generate a blinded multiplication result.

2. The method of claim 1, wherein the first blinded operand is generated by performing the one or more shift operations, and wherein performing the one or more shift operations includes appending a logic high value to the first operand after each of the one or more shift operations.

3. The method of claim 1, wherein the first blinded operand is generated by performing the one or more shift operations based on the first operand having a most significant bit (MSb) that is logic low.

4. The method of claim 1, wherein the first blinded operand is generated by performing the one or more shift operations, and wherein a number of shift operations associated with the one or more shift operations is less than a number of MSb(s) of the first operand that are logic low.

5. The method of claim 1, wherein the first blinded operand is generated by performing the one or more shift operations based on the first operand having a least significant bit (LSb) that is logic low.

6. The method of claim 1, wherein the first blinded operand is generated by performing the one or more shift operations, and wherein a number of shift operations associated with the one or more shift operations is less than a number of LSb(s) of the first operand that are logic low.

7. The method of claim 1, wherein the first blinded operand is generated by performing the one or more shift operations, the method further comprising randomly selecting a number of shift operations associated with the one or more shift operations.

8. The method of claim 1, further comprising:
   performing one or more shift operations of the second operand to yield a shifted second operand; and
   unblinding the blinded multiplication result based on the shifted second operand.

9. The method of claim 8, wherein performing the one or more shift operations of the second operand includes appending a logic low value to the second operand after each of the one or more shift operations of the second operand.

10. The method of claim 1, wherein the first blinded operand is generated by performing the bit-flip operation, the method further comprising randomly selecting a bit of the first operand to flip for the bit-flip operation.

11. The method of claim 1, further comprising performing one or more shift operations or a bit-flip operation on the second operand to generate a second blinded operand, wherein the multiplication operation is performed based on the first blinded operand and the second blinded operand to generate the blinded multiplication result.

12. An apparatus for performing a blinded operation, comprising: memory; and one or more processors coupled to the memory and configured to: obtain a first operand and a second operand for a multiplication operation; perform one or more shift operations or a bitflip operation on the first operand to generate a first blinded operand, wherein the first blinded operand is generated to reduce or randomize a difference between a power profile of the multiplication operation and a power profile of another multiplication operation in order to inhibit side channel attacks for the multiplication operation, the difference being reduced or randomized by implementing a hamming weight adjustment via the one or more shift operations or the bit-flip operation to modify the power profile of the multiplication operation; and perform the multiplication operation based on the first blinded operand and the second operand to generate a blinded multiplication result.

13. The apparatus of claim 12, wherein:
   to generate the first blinded operand, the one or more processors are configured to perform the one or more shift operations; and
   to perform the one or more shift operations, the one or more processors are configured to append a logic high value to the first operand after each of the one or more shift operations.

14. The apparatus of claim 12, wherein to generate the first blinded operand, the one or more processors are configured to perform the one or more shift operations based on the first operand having a most significant bit (MSb) that is logic low.

15. The apparatus of claim 12, wherein the first blinded operand is generated by performing the one or more shift operations, and wherein a number of shift operations associated with the one or more shift operations is less than a number of MSb(s) of the first operand that are logic low.

16. The apparatus of claim 12, wherein to generate the first blinded operand, the one or more processors are configured to perform the one or more shift operations based on the first operand having a least significant bit (LSb) that is logic low.

17. The apparatus of claim 12, wherein the first blinded operand is generated by performing the one or more shift operations, and wherein a number of shift operations associated with the one or more shift operations is less than a number of LSb(s) of the first operand that are logic low.

18. The apparatus of claim 12, wherein, to generate the first blinded operand, the one or more processors are configured to perform the one or more shift operations, the one or more processors being further configured to randomly select a number of shift operations associated with the one or more shift operations.

19. The apparatus of claim 12, wherein the one or more processors are further configured to:

perform one or more shift operations of the second operand to yield a shifted second operand; and unblind the blinded multiplication result based on the shifted second operand.

20. A computer-readable medium having instructions stored thereon, that when executed by one or more processors, are configured to: obtain a first operand and a second operand for a multiplication operation; perform one or more shift operations or a bit-flip operation on the first operand to generate a first blinded operand, wherein the first blinded operand is generated to reduce or randomize a difference between a power profile of the multiplication operation and a power profile of another multiplication operation in order to inhibit side channel attacks for the multiplication operation, the difference being reduced or randomized by implementing a hamming weight adjustment via the one or more shift operations or the bit-flip operation to modify the power profile of the multiplication operation; and perform the multiplication operation based on the first blinded operand and the second operand to generate a blinded multiplication result.

\* \* \* \* \*